United States Patent [19]

Nishikuri et al.

[11] Patent Number: 4,826,505
[45] Date of Patent: May 2, 1989

[54] MONOAZO PYRIDONE COMPOUNDS AND APPLICATION THEREOF FOR DYEING OF HYDROPHOBIC FIBER MATERIALS

[75] Inventors: Masao Nishikuri, Yokohama; Kiyoyasu Hashimoto, Nara; Hideo Hattori, Toyonaka, all of Japan

[73] Assignee: Sumitomo Chemical Company, Limited, Osaka, Japan

[21] Appl. No.: 153,790

[22] Filed: Feb. 8, 1988

[30] Foreign Application Priority Data

| Feb. 16, 1987 | [JP] | Japan | 62-32784 |
| Feb. 16, 1987 | [JP] | Japan | 62-32786 |
| Feb. 17, 1987 | [JP] | Japan | 62-35181 |
| Feb. 17, 1987 | [JP] | Japan | 62-35182 |

[51] Int. Cl.⁴ .................. C09B 29/00; C07D 213/72
[52] U.S. Cl. ............................. 8/688; 8/683; 8/684; 534/581; 534/630; 534/640; 534/766; 534/772; 546/296; 546/297
[58] Field of Search .......... 8/683, 684, 688, 693, 8/694, 451, 466; 534/581, 630, 640, 766, 772; 546/296, 297

[56] References Cited

U.S. PATENT DOCUMENTS

| 3,640,674 | 2/1972 | Berrie et al. | 8/693 |
| 3,869,441 | 3/1975 | Hughes | 8/688 |
| 3,905,951 | 9/1975 | Berrie et al. | 534/772 |
| 4,006,129 | 2/1977 | Heinrich et al. | 534/581 |
| 4,065,254 | 12/1977 | Bühler et al. | 8/688 |
| 4,380,452 | 4/1983 | Loeffler et al. | 534/772 |

FOREIGN PATENT DOCUMENTS 61-262191 11/1986 Japan .
1256340 12/1971 United Kingdom .
1317171 5/1973 United Kingdom ............ 8/683
1377612 12/1974 United Kingdom .
1377614 12/1974 United Kingdom .

*Primary Examiner*—Paul Lieberman
*Assistant Examiner*—Helene Kirschner
*Attorney, Agent, or Firm*—Stevens, Davis, Miller & Mosher

[57] ABSTRACT

A monoazo pyridone compound of the following formula,

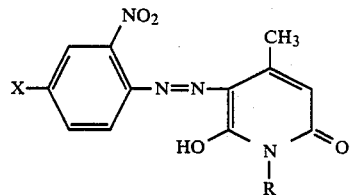

wherein X is a member selected from hydrogen, halogeno, alkyl, alkoxy, alkylcarbonyl, alkoxycarbonyl, aralkoxycarbonyl, alkylsulfonyl, arylsulfonyl, carbamoyl, sulfamoyl or cyano, and R is alkyl, alkenyl, cycloalkyl, phenyl or anilino, with the provisos that X is a member selected from those defined above except for hydrogen, chloro, methyl and methoxy when R is ethyl, and X is a member selected from those defined above except for alkyl when R is iso-butyl, which is stable under dyeing conditions, and useful for dyeing hydrophobic fiber materials to give dyed products of a deep, fast and brilliant color of greenish yellow to orange.

11 Claims, No Drawings

MONOAZO PYRIDONE COMPOUNDS AND APPLICATION THEREOF FOR DYEING OF HYDROPHOBIC FIBER MATERIALS

The present invention relates to monoazo pyridone compounds and their application for the dyeing of hydrophobic fiber materials.

Monoazo pyridone compounds are, in general, valuable as disperse dyes for dyeing hydrophobic fiber materials in a brilliant color of greenish yellow to orange, and therefor now increasing in their production and in their varieties. However, they are inferior in their dye bath stability to quinophthalone compounds which have been extensively used as disperse dyes for the yellow dyeing of hydrophobic fiber materials.

Many kinds of monoazo pyridone compounds are known, for example, as disclosed in British Patent Nos. 1256093, 1256094 and 1256095, and the like, and those having the following formulas (a) and (b),

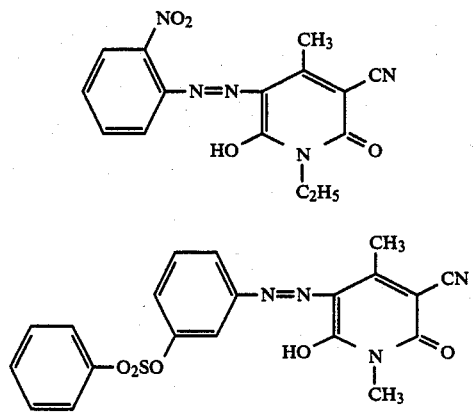

have been put into practice. However, the dye bath stability of the compounds (a) and (b) are as low as 20% and 50%, respectively.

In the present invention, the term "dye bath stability" is intended to mean a stability of a compound under dyeing conditions, which can be calculated by the following formula, (B/A) ×100 (%)

wherein A is a color depth of a dyed product obtained by the dyeing of a hydrophobic fiber under conditions of the dye concentration being 0.6% o.w.f., bath ratio being 1/30 and dyeing being carried out at 130° C. and pH 7 for 60 minutes, and B is that of a dyed product obtained in a manner such that a dye bath having the same dye concentration and bath ratio as above is allowed to stand at 140° C. and pH 7 for 30 minutes, and then the fiber to be dyed is introduced into the bath to carry out the dyeing at 130° C. for 60 minutes.

The present inventors have undertaken extensive studies to find a monoazo pyridone compound superior in dyeability and fastness properties as well as the dye bath stability, and as a result have found a specific monoazo pyridone compound meeting such needs.

The present invention provides a monoazo pyridone compound of the following formula (I),

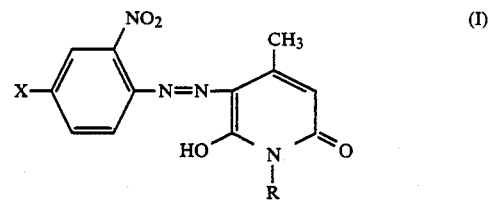

wherein X is a member selected from hydrogen, halogeno, alkyl, alkoxy, alkylcarbonyl, alkoxycarbonyl, aralkoxycarbonyl, alkylsulfonyl, arylsulfonyl, carbamoyl, sulfamoyl or cyano, and R is alkyl, alkenyl, cycloalkyl, phenyl or anilino, with the provisos that X is a member selected from those defined above except for hydrogen, chloro, methyl and methoxy when R is ethyl, and X is a member selected from those defined above except for alkyl when R is iso-butyl, and a process for producing the monoazo pyridone compound of the formula (I), which comprises reacting a diazonium salt of an aniline compound of the following formula (II),

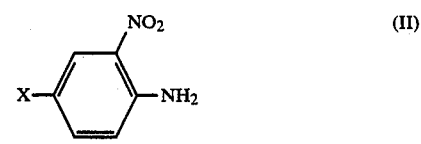

wherein X is as defined above, with a 4-methylpyridone compound of the following formula (III),

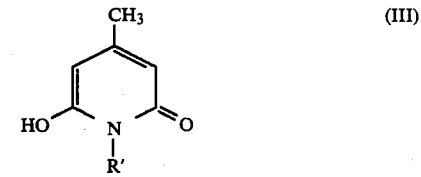

wherein R' is a hydrogen atom or the same meanings as those defined above for R, followed by the reaction with a dialkyl sulfate, an alkyl toluenesulfonate or a halide of the following formula,

Z - R       (IV)

wherein R is as defined above, and Z is a halogen atom, when the 4-methylpyridone compound having a hydrogen atom as R' is used.

The present invention also provides a process for dyeing hydrophbbic fiber materials, which comprises using the monoazo pyridone compound of the formula (I).

With respect to the symbol X in the formula (I), the alkyl and the alkyl moiety in the alkoxy, alkylcarbonyl, alkoxycarbonyl, aralkoxycarbonyl and alkylsulfonyl are preferably those having 1 to 4 carbon atoms. Examples of those represented by the symbol X are hydrogen, and chloro, bromo, iodo and fluoro as the halogeno, methyl, ethyl, propyl and butyl as the alkyl, methoxy, ethoxy, propoxy and butoxy as the alkoxy, acetyl and propionyl as the alkylcarbonyl, methoxycarbonyl, etoxycarbonyl, propoxycarbonyl and butoxycarbonyl as the alkoxycarbonyl, benzyloxycarbonyl as the aralkoxycarbonyl, methylsulfonyl, ethylsulfonyl, propylsulfonyl and butylsulfonyl as the alkylsulfonyl, phenylsulfonyl as the arylsulfonyl, carbamoyl, ethylcarbamoyl and butylcarbamoyl as the carbamoyl, sulfamoyl, ethylsulfamoyl and butylsulfamoyl as the sulfamoyl, and cyano.

With respect to the symbol R, the alkyl is a straight or branched one having 1 to 4 carbon atoms. Examples thereof are methyl, ethyl, n-propyl, iso-propyl, n-butyl, iso-butyl and sec-butyl. The alkenyl is preferably the one having 3 to 5 carbon atoms, and includes, for example, allyl and crotyl. The cycloalkyl is preferably the one having 5 or 6 carbon atoms which is unsubstituted or substituted by $C_1$ to $C_4$ alkyl Examples thereof are cyclohexyl, methylcyclohexyl and cyclopentyl. The phenyl and anilino may be unsubstitued or substituted by $C_1$ to $C_4$ alkyl, $C_1$ to $C_4$ alkoxy or halogeno. Examples thereof are phenyl, o-, m- or p-tolyl, o-, m- or p-methoxyphenyl, o-, m- or p-ethoxyphenyl, o-, m- or p-chlorophenyl, o-, m- or p-bromophenyl, anilino, o-, m- or p-methylanilino, o-, m- or p-chloroanilino and o-, m- or p-bromoanilino.

In the present invention, preferred examples of the monoazo pyridone compound (I) are those having methyl as R and hydrogen, chloro, bromo, methyl, ethyl, methylsulfonyl, ethylsulfonyl, phenylsulfonyl or cyano, particularly chloro or bromo, as X; ethyl as R and bromo, ethyl, methylsulfonyl, ethylsulfonyl, phenylsulfonyl or cyano, particularly bromo, as X; a straight or branched $C_3$ or $C_4$ alkyl, such as n-propyl, iso-propyl, n-butyl or iso-butyl, as R, and hydrogen, chloro, bromo, methyl, ethyl, methylsulfonyl, ethylsulfonyl, phenylsulfonyl or cyano as X; and $C_3$ to $C_5$ alkenyl, $C_5$ or $C_6$ cycloalkyl unsubstituted or substituted by $C_1$ to $C_4$ alkyl, or phenyl or anilino unsubstituted or substituted by $C_1$ to $C_4$ alkyl, $C_1$ to $C_4$ alkoxy or halogeno, as R, and hydrogen, chloro, bromo, methyl, ethyl, methylsulfonyl, ethylsulfonyl, phenylsulfonyl or cyano as X, wherein the alkenyl is preferably allyl and crotyl, the cycloalkyl is preferably cyclohexyl, methylcyclohexyl and cyclopentyl, the phenyl is preferably one unsubstituted or substituted by methyl, methoxy, ethoxy, chloro or bromo, and the anilino is preferably one unsubstituted or substituted by methyl, methoxy, chloro or bromo.

Among these monoazo pyridone compounds, particularly preferred are those having methyl as R and bromo or chloro as X; and ethyl as R and bromo as X.

In the production of the monoazo pyridone compound (I), the diazotization of the aniline compound (II) can be carried out in a manner well known in the art, and the coupling reaction between the diazonium salt of the aniline compound (II) and the 4-methylpyridone compound (III) can be carried out at a temperature of $-10°$ to $10°$ C. under a weak alkaline condition. When the 4-methylpyridone compound (III) having hydrogen as R' is used, the monoazo compound obtained above is successively allowed to react with the dialkyl sulfate, the alkyl toluenesulfonate or the halide (IV). This reaction can be carried out at a temperature of $10°$ to $200°$ C. in water, an organic solvent or a mixture thereof in the presence of an acid binding agent. Examples of the dialkyl sulfate and alkyl toluenesulfonate are dimethyl sulfate, diethylsulfate, methyl toluenesulfonate, ethyl toluenesulfonate and the like. After completion of the reaction, the desired monoazo pyridone compound (I) can be isolated from the reaction mixture in a manner well known in the art.

The thus obtained monoazo pyridone compound (I) can be subjected to dispersion in an usual manner prior to the application as the dye.

The dispersion can be performed, for example, in a sand mill using a suitable amount of an aqueous medium and a dispersing agent including anionic dispersing agents such as naphthalenesulfonic acid/formalin condensate, ligninsulfonic acid, cresol/Schaffer's acid/formalin condensate and the like, and nonionic dispersing agent such as polyoxyethylene alkyl ethers, polyoxyethylene alkylphenyl ethers and the like. The resulting dispersion liquor can be used as it is, or dried to be used in the form of a pulverulent or granular product.

The monoazo pyridone compounds (I) in accordance with the present invention can be used for dyeing hydrophobic fiber materials to give dyed products of a brilliant color of a greenish yellow to orange. The dyeing can be carried out in a conventional manner such as, for example, exhaustion dyeing, continuous dyeing and printing. The hydrophobic fiber materials include synthetic fibers such as polyamide and polyester fibers, semi-synthetic fibers such as di- or tri-acetate fibers, and mixed fibers thereof with natural fibers. The monoazo pyridone compounds (I) are particularly useful for dyeing polyester fibers and mixed fibers thereof with natural or regenerated cellulose fibers. In addition, the present compounds (I) are also useful for a transfer printing.

The present pyridone compound (I) can be characterized by excellent dye performance, particularly excellent build-up property and superior dye bath stability and light fastness to those of the above-described known compounds of the formulas (a) and (b), and moreover the present compound can give dyed products excellent in wet fastness, sublimation fastness and after-processing fastness.

The present invention is illustrated in more detail with reference to the following examples, which are only illustrative but not limitative for the scope of the present invention. In examples, parts are by weight, and color shades are those on polyester fibers.

EXAMPLE 1

A solution of sodium nitrite (7 parts) in water (50 parts) was added at 0° to 5° C. to a mixture of o-nitro-p-bromoaniline (21.7 parts), water (180 parts) and 30% hydrochloric acid (36 parts) under vigorous stirring to perform diazotization. The resulting clear diazonium solution was gradually added at 0° to 5° C. to a solution prepared in advance by dissolving 1-ethyl-4-methyl-6-hydroxypyrid-2-one (15.3 parts) in water (600 parts) containing 28% sodium hydroxide (25 parts), and the mixture was stirred for 30 minutes at that temperature. Thereafter, the reaction mixture was made acidic. The crystals were separated on a filter, washed and dried to obtain a compound of the following formula (1).

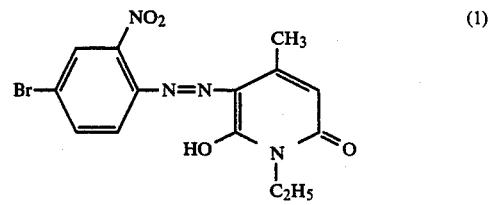

$\lambda$max 432 nm (DMF), color shade: greenish yellow

EXAMPLE 2

Example 1 was repeated, provided that o-nitro-p-ethylaniline (16.6 parts) was used in place of the o-nitrop-bromoaniline, thereby obtaining a compound of the following formula (2).

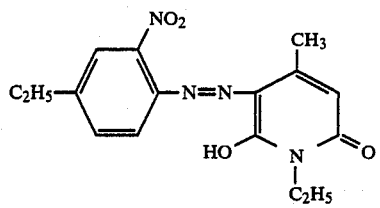

(2)

λmax 436 nm (DMF), color shade: yellow

A mixture of 5-(2-nitro-4-ethylphenylazo)-4-methyl-6-hydroxypyrid-2-one (30.2 parts), sodium carbonate (8.5 parts), ethyl iodide (31.4 parts), water (1.0 part) and chlorobenzene (120 parts) was allowed to react at 70° C. until the starting compounds disappeared. Thereafter, the reaction mixture was mixed with methanol (120 parts) to deposit crystals, which were separated on a filter, washed and then dried. Also in this manner, the compound of the above formula (2) was obtained.

EXAMPLE 3

Using the compounds (1) and (2) obtained in Examples 1 and 2, respectively, dyeing was carried out in the following manner.

a) Preparation of dispersion

| | |
|---|---|
| Compound (1) or (2) | 20 parts |
| Anionic dispersant* | 20 parts |
| Water | 60 parts |

*naphthalenesulfonic acid/formalin condensate

The above mixture was treated for 10 hours in a sand mill to prepare a dispersion.

b) Dyeing

The dispersion (3 parts) obtained above was placed in a dyeing pot with water (3000 parts), followed by adjustment of the pH to 5. Polyester fabric (100 parts) was placed therein, and dyeing was continued for 60 minutes at 130° C. Thereafter, the fabric was rinsed in a conventional manner and then dried, thereby obtaining a dyed product of a deep and brilliant greenish yellow color excellent in fastness properties including light fastness.

The compounds (1) and (2) have found to be more than 90% in the dye bath stability.

EXAMPLES 4 to 18

In a manner similar to that of Example 2, the compounds shown in the following table were obtained.

| Example No. | X in Formula (I) | Color shade | λmax nm (DMF) |
|---|---|---|---|
| 4 | $C_2H_5O$ | Reddish yellow | 457 |
| 5 | $CH_3CO$ | Greenish yellow | 431 |
| 6 | $H_9C_4OOC$ | Greenish yellow | 430 |
| 7 | ⌬—$CH_2OOC$ | Greenish yellow | 430 |
| 8 | ⌬—$OCH_2CH_2OOC$ | Greenish yellow | 430 |
| 9 | $H_3CO_2S$ | Greenish yellow | 430 |
| 10 | $H_5C_2HNO_2S$ | Greenish yellow | 432 |
| 11 | $H_9C_4HNO_2S$ | Greenish yellow | 432 |
| 12 | $H_5C_2HNCO$ | Greenish yellow | 433 |
| 13 | NC | Greenish yellow | 431 |
| 14 | F | Greenish yellow | 430 |
| 15 | ⌬—$O_2S$ | Greenish yellow | 431 |
| 16 | $H_5C_2O_2S$ | Greenish yellow | 430 |
| 17 | $H_9C_4O$ | Reddish yellow | 458 |
| 18 | I | Greenish yellow | 431 |

EXAMPLE 19

Using the dispersion obtained in item a) of Example 3, a printing paste having the following composition was prepared.

| | |
|---|---|
| The dispersion | 3 parts |
| Half emulsion stock paste* | 60 parts |
| Tartaric acid | 0.3 part |
| Sodium chlorate | 0.2 part |
| Balance (water) | 36.5 parts |

*Preparation of the stock paste: Kerosene (70 parts), water (25 parts) and an emulsifier (5 parts, Viskon KM-8, manufactured by Sinnakamura Chemical Co.) were mixed in a high speed mixer to obtain an emulsion. The emulsion obtained (30 parts) was mixed with Maypro Gum NP 12% paste (70 parts, manufactured by Gruenau Corp.) to prepare the stock paste.

The printing paste of the above composition was hand-printed on polyester fabric. The fabric waw predried and subjected to superheated steam treatment at 175° C. for 7 minutes, followed by washing and drying in a conventional manner, thereby obtaining a printed product of fast and brilliant greenish yellow color.

EXAMPLE 20

A solution of sodium nitrite (7 parts) in water (50 parts) was added at 0° to 5° C. to a mixture of o-nitroaniline (13.8 parts), water (180 parts) and 30% hydrochloric acid (36 parts) under vigorous stirring to perform diazotization. The resulting clear diazonium solution was gradually added at 0° to 5° C. to a solution prepared in advance by dissolving 1,4-dimethyl-6-hydroxypyrid-2-one (12.6 parts) in water (600 parts) containing 28% sodium hydroxide (25 parts) and sodium acetate (33 parts), and the mixture was stirred for 30 minutes at that temperature. Thereafter, the reaction mixture was made acidic. The crystals were separated on a filter, washed and then dried to obtain a compound of the following formula (3).

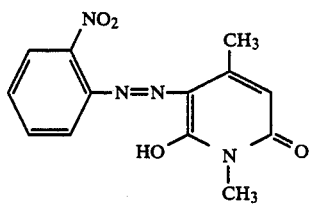

(3)

λmax 429 nm (DMF), color shade: greenish yellow

EXAMPLE 21

Example 20 was repeated, provided that o-nitro-p-methylaniline (15.2 parts) was used in place of the o-nitroaniline, thereby obtaining a compound of the following formula (4).

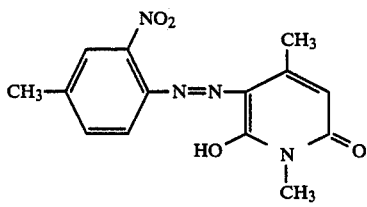

(4)

λmax 436 nm (DMF), color shade: greenish yellow

A mixture of 5-(2-nitro-4-methylphenylazo)-4-methyl-6-hydroxypyrid-2-one (28.8 parts), sodium carbonate (8.5 parts), potassium iodide (0.5 parts), methyl iodide (28.4 parts), water (1.0 part) and chlorobenzene (120 parts) was allowed to react at 80° C. until the starting compounds disappeared. Thereafter, the reaction mixture was mixed with methanol (120 parts) to deposit crystals, which were separated on a filter, washed and then dried. Also in this manner, the compound of the above formula (4) was obtained.

EXAMPLE 22

Using the compounds of the formulas (3) and (4) obtained in Examples 20 and 21, respectively, each dispersion was prepared in the same manner as in item a) of Example 3, and dyeing of polyester fabric was carried out in the same manner as in item b) of Example 3. Thus, each dyed product of deep and brilliant greenish yellow color excellent in fastness properties, particularly light fastness, and the dye bath stability of each compound was found to be more than 90%.

EXAMPLES 23 to 49

In a manner similar to that of Example 21, the compounds shown in the following table were obtained.

| Example No. | X in Formula (I) | Color shade | λmax nm (DMF) |
|---|---|---|---|
| 23 | Cl | Greenish yellow | 438 |
| 24 | CH$_3$O | Reddish yellow | 454 |
| 25 | C$_2$H$_5$O | Reddish yellow | 455 |
| 26 | n-C$_3$H$_7$O | Reddish yellow | 456 |
| 27 | n-C$_4$H$_9$O | Reddish yellow | 456 |
| 28 | C$_2$H$_5$ | Greenish yellow | 436 |
| 29 | n-C$_3$H$_7$ | Greenish yellow | 436 |
| 30 | n-C$_4$H$_9$ | Greenish yellow | 437 |
| 31 | iso-C$_3$H$_7$O | Reddish yellow | 456 |
| 32 | iso-C$_4$H$_9$O | Reddish yellow | 457 |
| 33 | iso-C$_3$H$_7$ | Greenish yellow | 437 |
| 34 | iso-C$_4$H$_9$ | Greenish yellow | 438 |
| 35 | CH$_3$CO | Greenish yellow | 430 |
| 36 | n-H$_9$C$_4$OOC | Greenish yellow | 431 |
| 37 | ⟨C$_6$H$_5$⟩CH$_2$OOC | Greenish yellow | 430 |
| 38 | H$_3$CO$_2$S | Greenish yellow | 432 |
| 39 | H$_5$C$_2$HNO$_2$S | Greenish yellow | 433 |
| 40 | n-H$_9$C$_4$HNO$_2$S | Greenish yellow | 433 |
| 41 | H$_5$C$_2$HNCO | Greenish yellow | 433 |
| 42 | NC | Greenish yellow | 432 |
| 43 | Br | Greenish yellow | 431 |
| 44 | I | Greenish yellow | 432 |
| 45 | F | Greenish yellow | 433 |
| 46 | H$_5$C$_2$O$_2$S | Greenish yellow | 433 |
| 47 | iso-H$_9$C$_4$O$_2$S | Greenish yellow | 432 |
| 48 | ⟨C$_6$H$_5$⟩O$_2$S | Greenish yellow | 429 |
| 49 | n-C$_4$H$_9$CO | Greenish yellow | 431 |

EXAMPLE 50

Using the dispersions obtained in Example 22, each printing paste was prepared in the same manner as in Example 19, and printing of polyester fabric was carried out in the same manner as in Example 19. Thus, each printed product of a fast and brilliant greenish yellow color was obtained.

EXAMPLE 51

Example 20 was repeated, provided that 1-n-butyl-4-methyl-6-hydroxypyrid-2-one (16.8 parts) was used in place of the 1,4-dimethyl-6-hydroxypyrid-2-one, thereby obtaining a compound of the following formula (5).

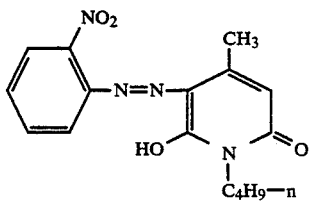

(5)

λmax 431 nm (DMF), color shade: greenish yellow

EXAMPLE 52

Example 51 was repeated, provided that o-nitro-p-bromoaniline (21.7 parts) and 1-n-propyl-4-methyl-6-hydroxypyrid-2-one (15.4 parts) were used in place of the o-nitroaniline and 1-n-butyl-4-methyl-6-hydroxypyrid-2-one, respectively, thereby obtaining a compound of the following formula (6).

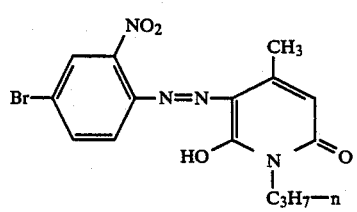

λmax 432 nm (DMF), color shade: greenish yellow

The compound of the above formula (6) was also obtained by the condensation reaction between 5-(2-nitro-4-bromophenylazo)-4-methyl-6-hydroxypyrid-2-one (35.3 parts) and n-propyl iodide (30.0 parts) in a manner similar to that of the latter part of Example 21.

EXAMPLE 53

Using the compounds of the formulas (5) and (6) obtained in Examples 51 and 52, respectively, each dispersion was prepared in the same manner as in item a) of Example 3, and dyeing of polyester fabric was carried out in the same manner as in item b) of Example 3. Thus, each dyed product of deep and brilliant greenish yellow color excellent in fastness properties, particularly light fastness, and the dye bath stability of each compound was found to be more than 90%.

EXAMPLED 54 to 77

In a manner similar to that of Example 52, the compounds shown in the following table were obtained.

| Example No. | Formula (I) X | R | Color shade | λmax nm (DMF) |
|---|---|---|---|---|
| 54 | Cl | $C_3H_7-n$ | Greenish yellow | 431 |
| 55 | Cl | $C_3H_7-iso$ | Greenish yellow | 431 |
| 56 | Cl | $C_4H_9-n$ | Greenish yellow | 431 |
| 57 | Cl | $C_4H_9-iso$ | Greenish yellow | 431 |
| 58 | Br | $C_3H_7-n$ | Greenish yellow | 431 |
| 59 | H | $C_3H_7-n$ | Greenish yellow | 430 |
| 60 | $CH_3O$ | $C_3H_7-O$ | Reddish yellow | 457 |
| 61 | $C_2H_5O$ | $C_3H_7-n$ | Reddish yellow | 456 |
| 62 | $CH_3CO$ | $C_3H_7-iso$ | Greenish yellow | 431 |
| 63 | $n-H_9C_4OOC$ | $C_3H_7-iso$ | Greenish yellow | 430 |
| 64 | Ph-$CH_2OOC$ | $C_4H_9-n$ | Greenish yellow | 430 |
| 65 | $H_3CO_2S$ | $C_4H_9-n$ | Greenish yellow | 430 |
| 66 | $H_5C_2HNO_2S$ | $C_4H_9-iso$ | Greenish yellow | 432 |
| 67 | $iso-H_9C_4HNO_2S$ | $C_4H_9-iso$ | Greenish yellow | 432 |
| 68 | $H_5C_2HNCO$ | $C_3H_7-iso$ | Greenish yellow | 433 |
| 69 | NC | $C_3H_7-iso$ | Greenish yellow | 431 |
| 70 | I | $C_3H_7-iso$ | Greenish yellow | 431 |
| 71 | F | $C_4H_9-n$ | Greenish yellow | 430 |
| 72 | Ph-$O_2S$ | $C_4H_9-n$ | Greenish yellow | 431 |
| 73 | H | $C_4H_9-iso$ | Greenish yellow | 428 |
| 74 | H | $C_4H_9-sec$ | Greenish yellow | 428 |
| 75 | H | $C_3H_7-iso$ | Greenish yellow | 427 |
| 76 | $H_5C_2O_2S$ | $C_3H_7-iso$ | Greenish yellow | 431 |
| 77 | $n-C_4H_9O$ | $C_3H_7-n$ | Reddish yellow | 458 |

EXAMPLE 78

Using the dispersions obtained in Example 53, each printing paste was prepared in the same manner as in Example 19, and printing of polyester fabric was carried out in the same manner as in Example 19. Thus, each printed product of a fast and brilliant greenish yellow color was obtained.

EXAMPLE 79

Example 20 was repeated, provided that 1-allyl-4-methyl-6-hydroxypyrid-2-one (16.7 parts) was used in place of the 1,4-dimethyl-6-hydroxypyrid-2-one, thereby obtaining a compound of the following formula (7).

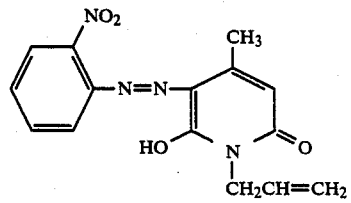

λmax 432 nm (DMF), color shade: greenish yellow

EXAMPLE 80

Example 79 was repeated, provided that o-nitro-p-methylaniline (15.2 parts) and 1-cyclohexyl-4-methyl-6-hydroxypyrid-2-one (20.7 parts) were used in place of the o-nitroaniline and 1-allyl-4-methyl-6-hydroxypyrid-2-one, respectively, thereby obtaining a compound of the following formula (8).

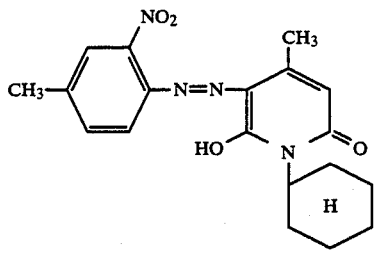
(8)

λmax 435 nm (DMF), color shade: greenish yellow

The compound of the above formula (8) was also obtained by the condensation reaction between 5-(2-nitro-4-methylphenylazo)-4-methyl-6-hydroxypyrid-2-one (28.8 parts) and cyclohexyl bromide (16.6 parts) in a manner similar to that of the latter part of Example 21.

EXAMPLE 81

Using the compounds of the formulas (7) and (8) obtained in Examples 79 and 80, respectively, each dispersion was prepared in the same manner as in item a) of Example 3, and dyeing of polyester fabric was carried out in the same manner as in item b) of Example 3. Thus, each dyed product of deep and brilliant greenish yellow color excellent in fastness properties, particularly light fastness, and the dye bath stability of each compound was found to be more than 90%.

EXAMPLE 82 to 113

In a manner similar to that of Example 80, the compounds shown in the following table were obtained.

| Example No. | Formula (I) X | R | Color shade | λmax nm (DMF) |
|---|---|---|---|---|
| 82 | H | —CH$_2$CH=CHCH$_3$ | Greenish yellow | 431 |
| 83 | H | —⟨phenyl⟩ | Greenish yellow | 432 |
| 84 | H | —⟨phenyl⟩—CH$_3$ | Greenish yellow | 432 |
| 85 | Cl | —NH—⟨phenyl⟩ | Greenish yellow | 430 |
| 86 | Cl | —CH$_2$CH=CH$_2$ | Greenish yellow | 431 |
| 87 | Br | —CH$_2$CH=CH$_2$ | Greenish yellow | 431 |
| 88 | CH$_3$O | —CH$_2$CH=CH$_2$ | Reddish yellow | 456 |
| 89 | CH$_3$O | —⟨cyclohexyl H⟩ | Reddish yellow | 457 |
| 90 | Cl | —⟨cyclohexyl H⟩ | Greenish yellow | 432 |
| 91 | Br | —⟨cyclohexyl H⟩ | Greenish yellow | 432 |
| 92 | Cl | —⟨phenyl⟩ | Greenish yellow | 430 |
| 93 | Br | —⟨phenyl⟩ | Greenish yellow | 430 |

-continued

| Example No. | Formula (I) X | R | Color shade | λmax nm (DMF) |
|---|---|---|---|---|
| 94 | Cl | 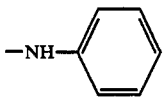 —NH—C₆H₅ | Greenish yellow | 431 |
| 95 | Br | 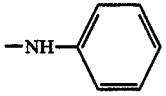 —NH—C₆H₅ | Greenish yellow | 430 |
| 96 | Br | —CH₂CH=CHCH₃ | Greenish yellow | 432 |
| 97 | Br | 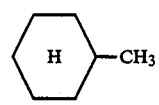 4-methylcyclohexyl | Greenish yellow | 432 |
| 98 | Br | 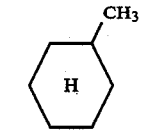 2-methylcyclohexyl | Greenish yellow | 432 |
| 99 | Br | 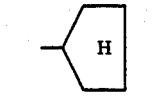 cyclopentyl | Greenish yellow | 432 |
| 100 | CH₃ | 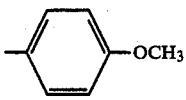 —C₆H₄—OCH₃ | Greenish yellow | 431 |
| 101 | CH₃ | 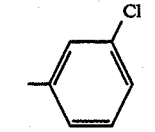 —C₆H₄—Cl | Greenish yellow | 431 |
| 102 | CH₃ | 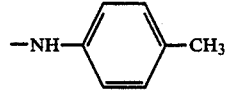 —NH—C₆H₄—CH₃ | Greenish yellow | 430 |
| 103 | C₂H₅O | CH₂CH=CH₂ | Reddish yellow | 458 |
| 104 | CH₃CO | CH₂CH=CH₂ | Greenish yellow | 431 |
| 105 | n-H₉C₄OOC | CH₂CH=CH₂ | Greenish yellow | 430 |
| 106 | C₆H₅CH₂OOC | CH₂CH=CH₂ | Greenish yellow | 430 |
| 107 | H₃CO₂S | CH₂CH=CH₂ | Greenish yellow | 430 |
| 108 | H₅C₂HNO₂S | CH₂CH=CH₂ | Greenish yellow | 430 |
| 109 | iso-H₉C₄HNO₂S | CH₂CH=CH₂ | Greenish yellow | 432 |
| 110 | H₅C₂HNCO | CH₂CH=CH₂ | Greenish yellow | 433 |
| 111 | NC | CH₂CH=CH₂ | Greenish yellow | 431 |
| 112 | CH₃CO | 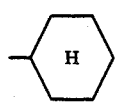 cyclohexyl | Greenish yellow | 431 |

| | Formula (I) | | | |
|---|---|---|---|---|
| Example No. | X | R | Color shade | λmax nm (DMF) |
| 113 | 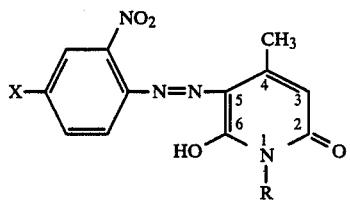—CH₂OOC | H | Greenish yellow | 431 |

EXAMPLE 114

Using the dispersions obtained in Example 81, each printing paste was prepared in the same manner as in Example 19, and printing of polyester fabric was carried out in the same manner as in Example 19. Thus, each printed product of a fast and brilliant greenish yellow color was obtained.

What is claimed is:

1. A monoazo pyridone compound of the following formula, $$\text{[structure with NO}_2\text{, X, N=N, CH}_3\text{, HO, N-R, =O]}$$

wherein X is a member selected from hydrogen, halogeno, alkyl, alkoxy, alkylcarbonyl, alkoxycarbonyl, aralkoxycarbonyl, alkylsulfonyl, arylsulfonyl, carbamoyl, sulfamoyl or cyano, and R is alkyl, alkenyl, cycloalkyl, phenyl or anilino, with the provisos that X is a member selected from those defined above except for hydrogen, chloro, methyl and methoxy when R is ethyl, and X is a member selected from those defined above except for alkyl when R is iso-butyl.

2. A monoazo pyridone compound according to claim 1, wherein X is hydrogen, chloro, bromo, methyl, ethyl, methylsulfonyl, ethylsulfonyl, phenylsulfonyl or cyano and R is methyl.

3. A monoazo pyridone compound according to claim 2, wherein X is chloro or bromo.

4. A monoazo pyridone compound according to claim 1, wherein X is bromo, ethyl, methylsulfonyl, ethylsulfonyl, phenylsulfonyl or cyano and R is ethyl.

5. A monoazo pyridone compound according to claim 4, wherein X is bromo.

6. A monoazo pyridone compound according to claim 1, wherein X is hydrogen, chloro, bromo, methyl, ethyl, methylsulfonyl, ethylsulfonyl, phenylsulfonyl or cyano, and R is straight or branched $C_3$ or $C_4$ alkyl.

7. A monoazo pyridone compound according to claim 6, wherein R is n- or iso-propyl or n- or iso-butyl.

8. A monoazo pyridone compound according to claim 1, wherein X is hydrogen, chloro, bromo, methyl, ethyl, methylsulfonyl, ethylsulfonyl, phenylsulfonyl or cyano and R is $C_3$ to $C_5$ alkenyl, $C_5$ or $C_6$ cycloalkyl unsubstituted or substituted by $C_1$ to $C_4$ alkyl, or phenyl or anilino unsubstituted or substituted by $C_1$ to $C_4$ alkyl, $C_1$ to $C_4$ alkoxy or halogeno.

9. A monoazo pyridone compound according to claim 8, wherein R is allyl, crotyl, cyclohexyl, methylcyclohexyl, cyclopentyl, phenyl unsubstituted or substituted by methyl, methoxy, ethoxy, chloro or bromo, or anilino unsubstituted or substituted by methyl, methoxy, chloro or bromo.

10. A process for dyeing hydrophobic fiber materials, which comprises using a monoazo pyridone compound of the following formula,

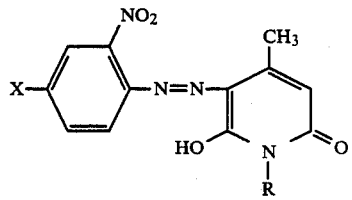

wherein X is a member selected from hydrogen, halogeno, alkyl, alkoxy, alkylcarbonyl, alkoxycarbonyl, aralkoxycarbonyl, alkylsulfonyl, arylsulfonyl, carbamoyl, sulfamoyl or cyano, and R is alkyl, alkenyl, cycloalkyl, phenyl or anilino, with the provisos that X is a member selected from those defined above except for hydrogen, chloro, methyl and methoxy when R is ethyl, and X is a member selected from those defined above except for alkyl when R is iso-butyl.

11. Hydrophobic fiber materials dyed by the process of claim 10.

* * * * *